(12) United States Patent
Deutsch

(10) Patent No.: US 12,346,983 B2
(45) Date of Patent: *Jul. 1, 2025

(54) FOOD TRUCK VENDING SYSTEM AND METHOD

(71) Applicant: Jeremy Deutsch, New York, NY (US)

(72) Inventor: Jeremy Deutsch, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/635,514

(22) Filed: Apr. 15, 2024

(65) Prior Publication Data

US 2024/0331065 A1 Oct. 3, 2024

Related U.S. Application Data

(63) Continuation of application No. 17/243,418, filed on Apr. 28, 2021, now Pat. No. 11,983,784, which is a continuation-in-part of application No. 16/544,389, filed on Aug. 19, 2019, now abandoned, which is a continuation of application No. 15/676,010, filed on Aug. 14, 2017, now abandoned.

(60) Provisional application No. 62/374,356, filed on Aug. 12, 2016.

(51) Int. Cl.
| | |
|---|---|
| G06Q 50/12 | (2012.01) |
| G06Q 20/32 | (2012.01) |
| G06Q 30/0601 | (2023.01) |

(52) U.S. Cl.
CPC .......... G06Q 50/12 (2013.01); G06Q 20/322 (2013.01); G06Q 20/3224 (2013.01); G06Q 30/0633 (2013.01)

(58) Field of Classification Search
CPC .. G06Q 50/12; G06Q 20/322; G06Q 20/3224; G06Q 30/0633; G06Q 20/12
See application file for complete search history.

(56) References Cited

U.S. PATENT DOCUMENTS

| | | |
|---|---|---|
| 7,305,350 B1 | 12/2007 | Bruecken |
| 2013/0027227 A1 | 1/2013 | Nordstrom |

*Primary Examiner* — A. Hunter Wilder
(74) *Attorney, Agent, or Firm* — Riverside Law LLP

(57) ABSTRACT

Efficient distribution of goods and services, and, more particularly, a method and system for vending goods to remote users from a temporary location, is disclosed. A user may place an order with a vendor via a mobile application.

10 Claims, 5 Drawing Sheets

FIG. 5

FOOD TRUCK VENDING SYSTEM AND METHOD

CROSS-REFERENCE TO RELATED APPLICATIONS

This application is a continuation application of U.S. patent application Ser. No. 17/243,418 filed Apr. 28, 2021, which is a continuation-in-part of U.S. patent application Ser. No. 16/544,389 filed Aug. 19, 2019, which is a continuation of U.S. patent application Ser. No. 15/676,010 filed Aug. 14, 2017, which claims priority to U.S. Patent Application 62/374,356 filed Aug. 12, 2016, the entireties of each of which are incorporated herein by reference.

FIELD OF THE INVENTION

The present invention relates to efficient distribution of goods and services, and, more particularly, a method and system for vending goods to remote users from a temporary location.

BACKGROUND

In the known art, various types of take-out food access are known. For example, it may be typical that one dials the number for a pizza parlor, places an order over the phone, and goes to pick-up and pay for the pizza. Moreover, it is known that, in large urban areas, so called "food trucks" are common for vending of foodstuffs, in which food is cooked, and customers wait in a line at a window of the food truck to order and pay for the food made in the truck. However, in the particular embodiment of a food truck, inconvenience is heightened because one must wait in the line, place an order, and wait for the order to be cooked/made prior to paying for and departing with the food. Because food trucks are often in urban areas where persons are particularly busy, such as because of type of employment-type, this waiting time period can prove exceedingly inconvenient and unproductive.

Therefore, the need exists for a take-out method for food from a temporary vending location that is more expedient and efficient than in the known art.

BRIEF DESCRIPTION OF THE DRAWINGS

This disclosure is illustrated by way of example and not by way of limitation in the accompanying figure(s). The figure(s) may, alone or in combination, illustrate one or more embodiments of the disclosure. Elements illustrated in the figure(s) are not necessarily drawn to scale. Reference labels may be repeated among the figures to indicate corresponding or analogous elements.

DETAILED DESCRIPTION

Figure 1:
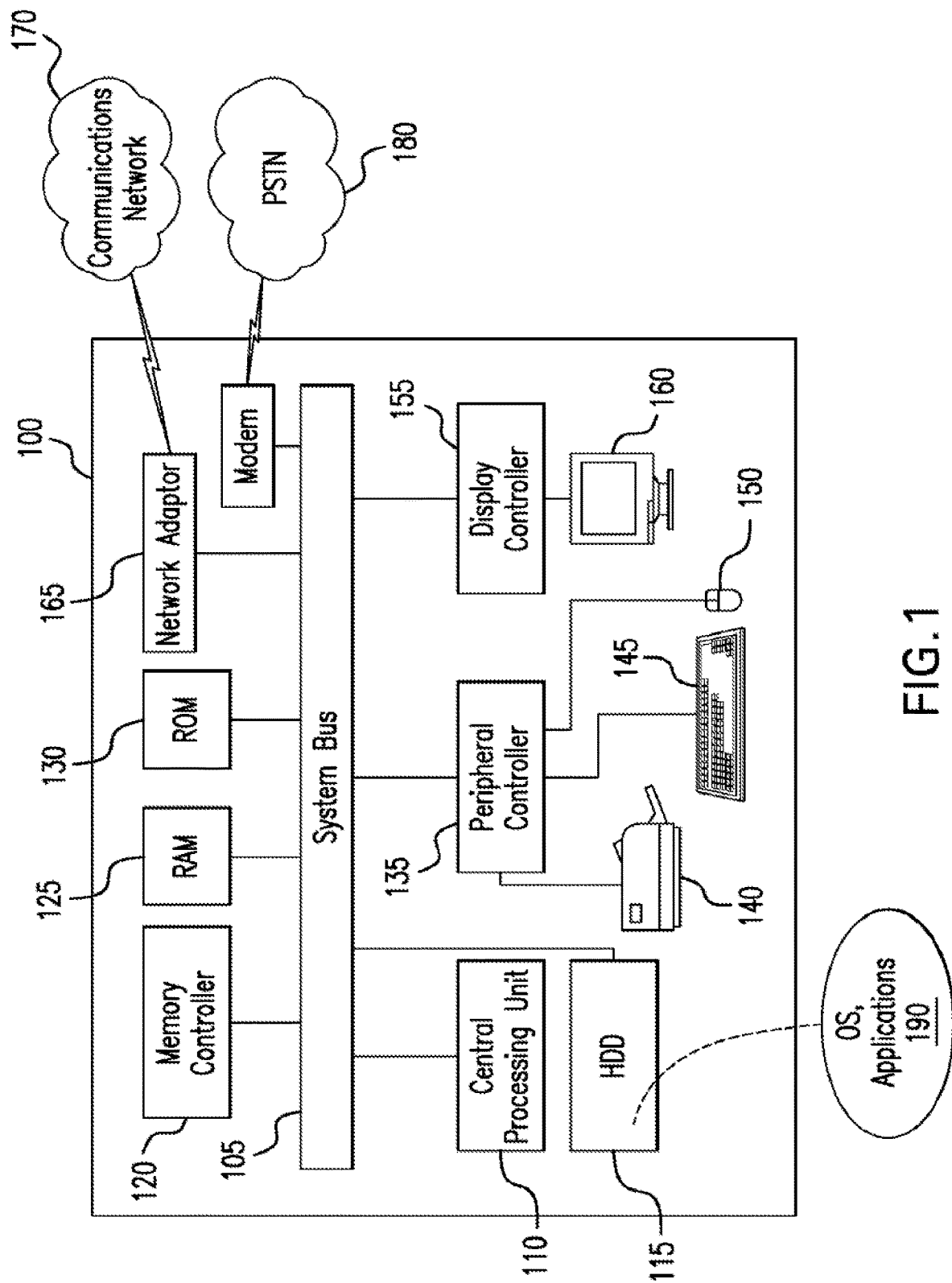
FIG. 1 illustrates an aspect of an exemplary embodiment of the present invention.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

FIG. 1 depicts an exemplary computing system 100 for use in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output and/or presentation generated by or at the request of computing system 100. Such visual output may include text, graphics, animated graphics, and/or video, for example. Display 160 may be implemented with a CRT-based video display, an LCD-based flat-panel display, gas plasma-based flat-panel display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet. Communications network 170 may provide user access for computing system 100 with means of communicating and transferring software and information electronically. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used. It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
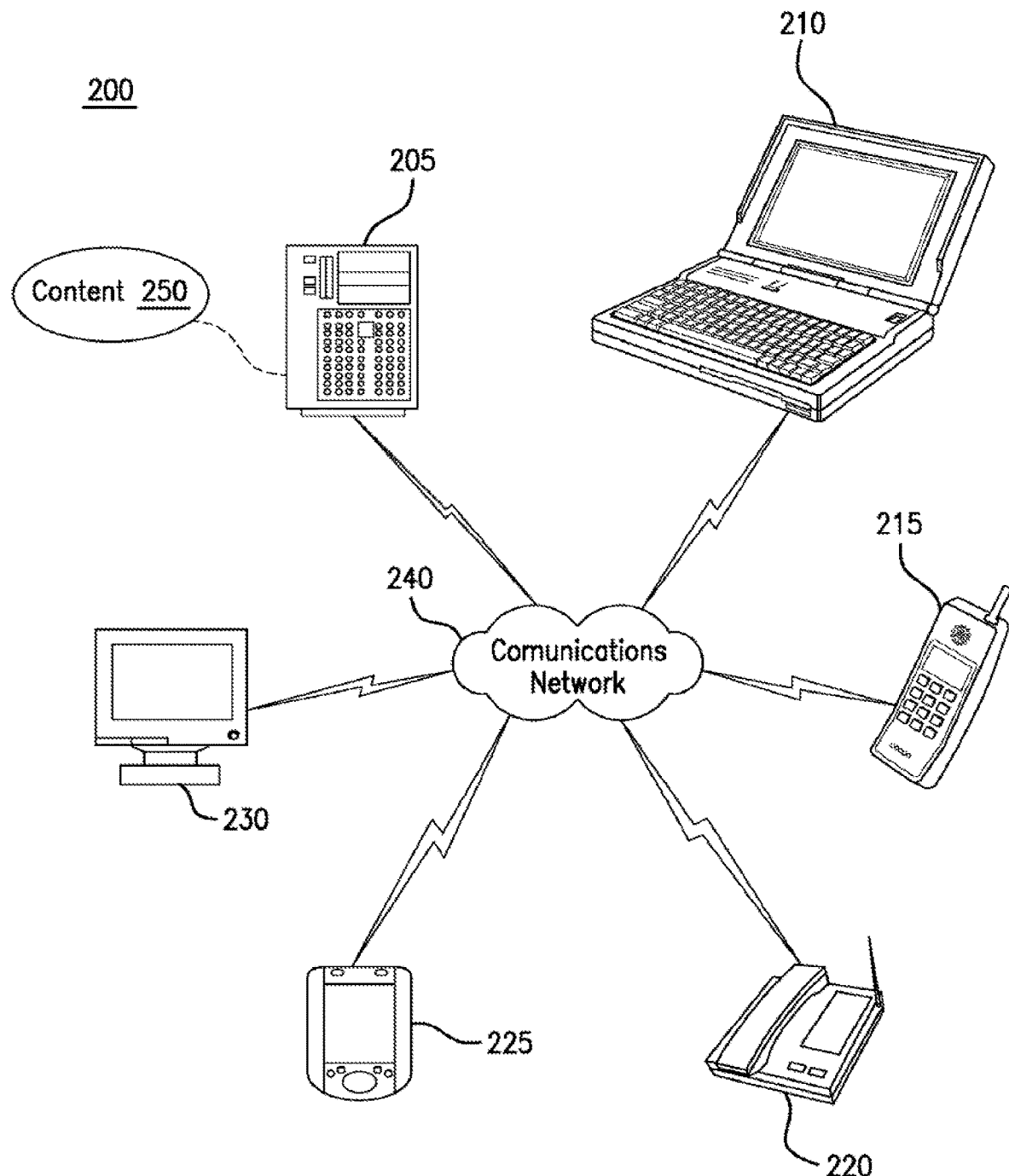
FIG. 2 illustrates an aspect of an exemplary embodiment of the present invention.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or the like, to interact with server 205.

Figure 3:
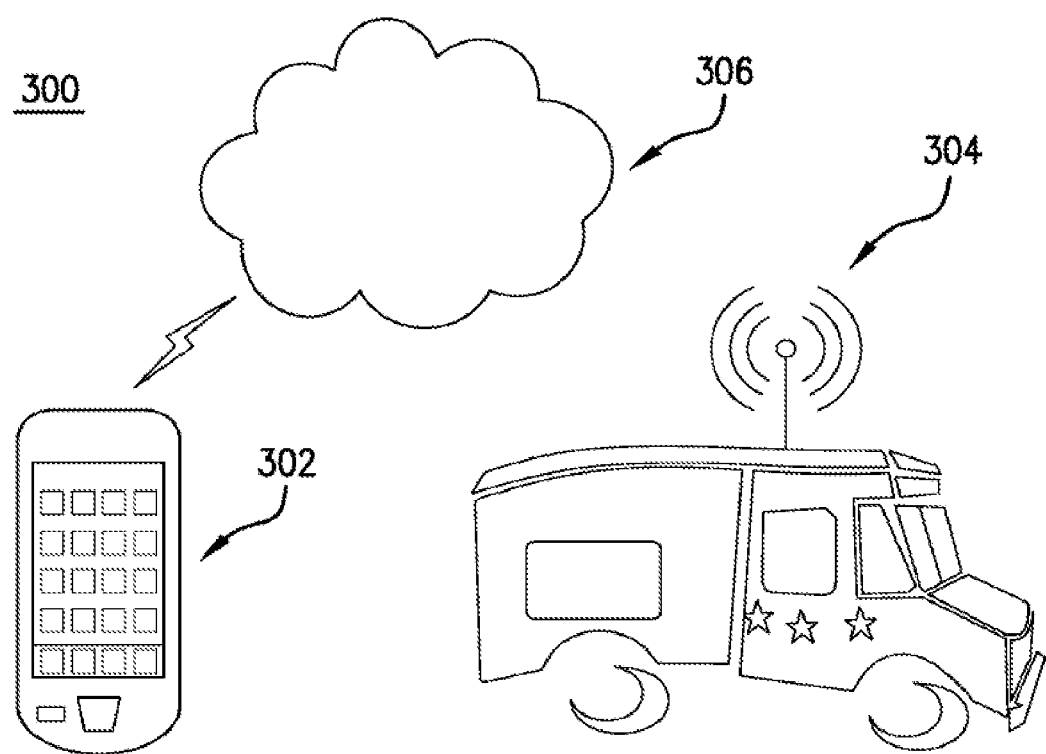
FIG. 3 is an overview diagram of the present invention.

FIG. 3 shows an overall high level diagram 300 of at least one embodiment of the invention. A user, via at least one mobile device 302, may access information related to one or more available vendors (as described below) via a network 306. The network 306 may comprise the Internet, a LAN, or the like. The network may further include a server and/or a database (not shown) used to track, in real-time or near real-time, one or more available vending locations 304. The vending locations may be temporary or permanent and may comprise vendors selling perishable and non-perishable items, such as food, drink, flowers, jewelry, or the like. The foregoing information may be made part of a hash ledger available to vendors, as discussed further below.

Figure 4:
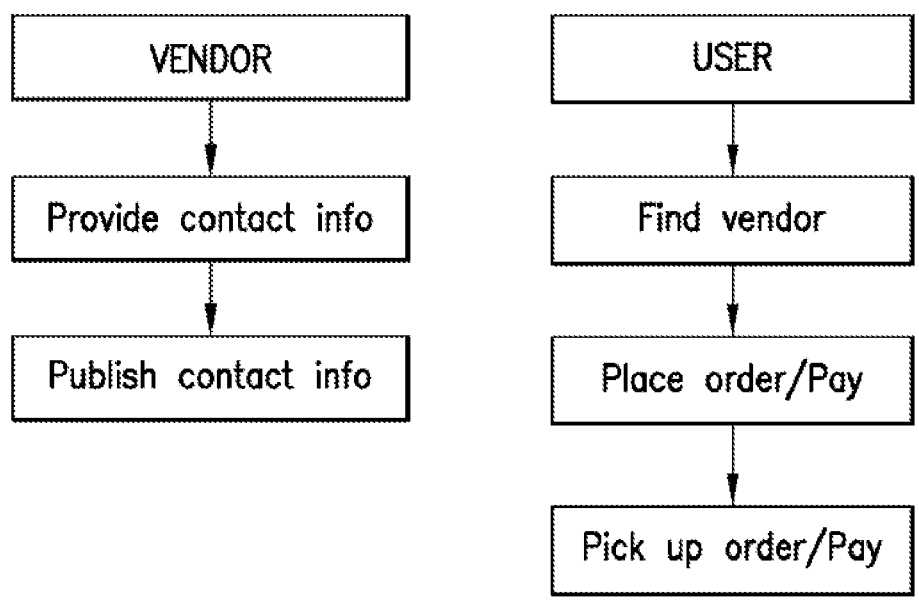
FIG. 4 is a workflow process of the present invention.

The disclosed exemplary embodiments are illustrated in the flow diagram 4( )( ) of FIG. 4. In the illustration, either a vending truck may have a phone number, such as in relation to a mobile phone, associated with the particular truck, or a phone number may be associated with a series of trucks, to enable provision of a service, such as a vending truck order service. The number, of course, may be published via any means known in the art, such as online, by paper, or by word of mouth.

In the illustration, a customer dials either a direct number of a food truck, a series of food trucks, or an associated vending service, and places and order, such as from a menu published on, for example, an ordering app or on the Internet. That is, included in the reference to phone calls made herein, orders may be placed through one or more apps/applications, such as dedicated mobile phone apps.

Following the step of placement of the order, a user may optionally pay for the order. Such payments may be received, for example, over the phone, or via the app referenced, such as using a credit card, Paypal@, Google Wallet@, or any similar known payment methodology. Alternatively, those skilled in the art will appreciate that payment may not be made until the customer arrives at the vending truck to pick-up the food, although the likelihood that the food will be made but the customer will never come and pick the food up, and hence no payment for the food will ever be made, is obviously heightened if the food is paid for only upon arrival at the food truck. Such order, payment, and delivery information may be included a food sales hash ledger, as discussed throughout.

It may additionally be that a user may place an order, such as via telephone or the aforementioned app, for particular food stuffs, and the user may be matched with a vending truck that is closest to the user geographically, to a vending truck from which the user most frequently orders food stuffs (such as via tracking of prior orders, geographic position of the user's phone, or the like), to the highest rated vending truck offering similar food stuffs in the geographic area of the user, or the like. That is, there may be no singular truck to fulfill orders for particular food stuffs, but rather the food truck network may allow for distribution of orders of particular food stuffs among multiple trucks.

The user may receive an indication of the time period in which the food will be ready when the order is placed, or may later receive such an indication, such as over the app, via text message, via return phone call, or the like, wherein it is indicated to the user that the food has been prepared.

Once the food has been prepared, the user may proceed to the vending truck and pick-up the order, such as via dedicated window for pre-orders, and accordingly the user may not have to wait in line to pick-up the order nor must the user wait while the food is made.

In additional and alternative embodiments, such as wherein an ordering service is used as discussed above, a delivery service may also be provided. That is, a delivery service may pick-up ordered foods stuffs from vending trucks, such as upon indication that food is ready at a particular food truck after ordering from that food truck through an app, and a delivery person may take the food stuffs and deliver to the ordering customer. Needless to say, such a delivery service may use distributed delivery, such that deliveries may be efficiently targeted in certain locations, or in a certain order, based on the concentration of orders for particular food stuffs, orders from particular vending trucks, or the like. A significant factor in such distribution of delivery, as well as in distribution of order placement, may be geographic proximity between an ordering customer and a vending truck offering particular food stuffs, although other known factors may, of course, be considered.

Secure Hash Algorithms (SHA) are a family of cryptographic functions designed to keep data secure. SHAs work by transforming the data using a hash function, which is an algorithm that consists of bitwise operations, modular additions, and compression functions.

A hash function is a mathematical function that converts an input value into a compressed numerical value, referenced as a hash or hash value. The length of the output or hash depends on the hashing algorithm.

More particularly, hashing is used to index and retrieve items in a database, in part because it is more simple, from a processing perspective, to find the item using the hashed than to find it using the original value. Moreover, hashes may be made available to create a public member ledger, which may add an additional layer of security and verifiability.

Consider the problem of searching an array for a given value—a complex processing issue. However, if given a hash value that defines an address in a hash table at which the desired data resides, the search is greatly simplified.

Simply put, encryption is a two-way function—that is, what is encrypted can be decrypted with the proper key. Hashing, however, is a one-way function that eliminates the original data's plain text, in its place producing a unique hash message digest. The hash cannot be discerned unless the recipient is given information on where to find the message digest, and the information itself cannot be spoofed or copied, as that spoofing will not show as part of the public record.

Figure 5:
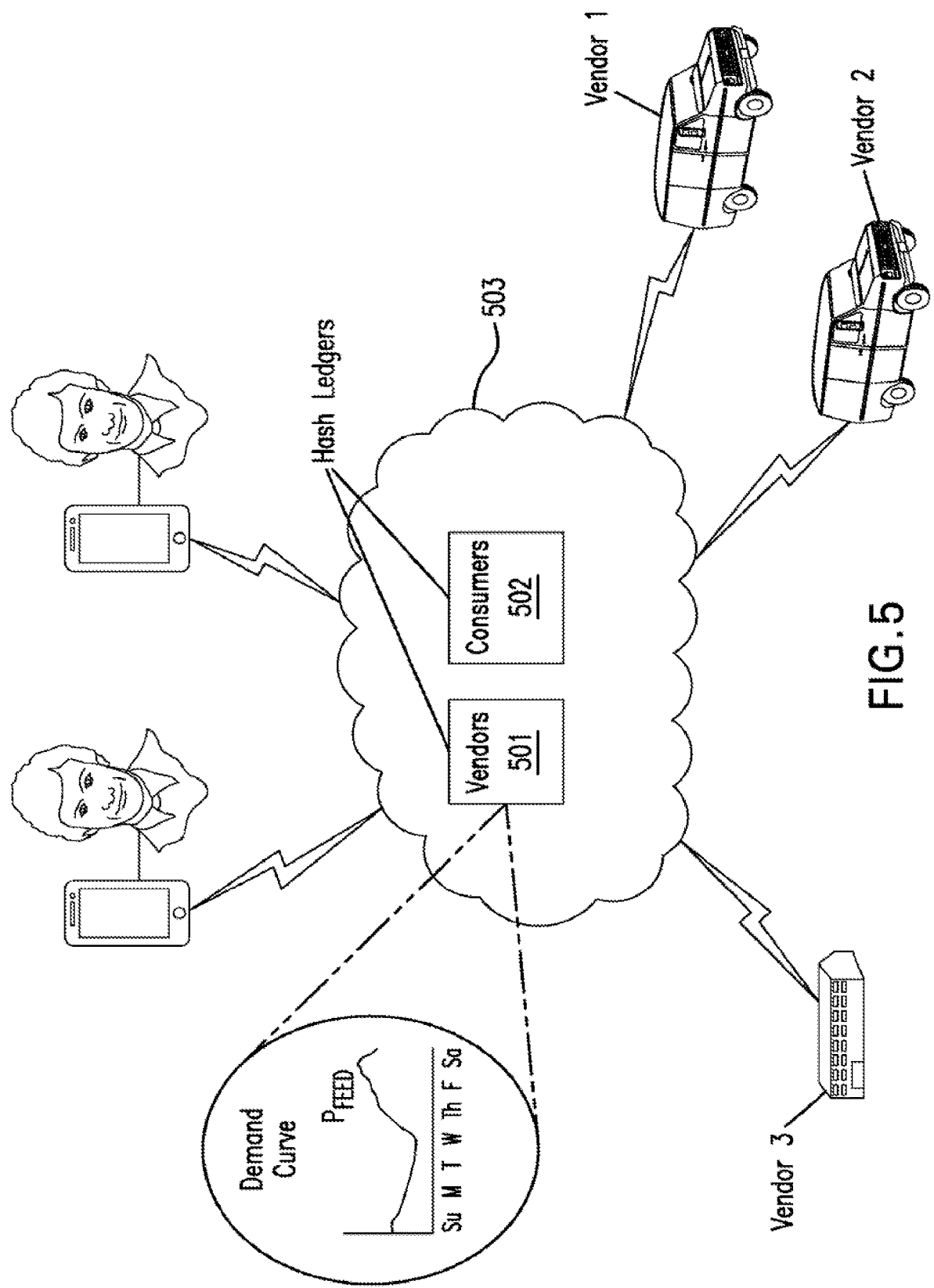
FIG. 5 is an illustration of the invention.

The embodiments may employ a continuously building and updating hash ledger in making deliveries, particularly for food as discussed throughout. For example, the hash may, in part, comprise a "demand hash", as shown in FIG. 5. The demand hash may include information, such as being geographically based, on demand for different types of food or drinks at varying times. This demand tracking stems, in part, from the orders received by the businesses themselves, wherein those transactions are recorded as part of the food business hash ledger.

That is, Philadelphia may have a demand hash for pizza hourly over the course of each distinct day of the week, or, more particularly, unique areas of a city, such as the northeast, southwest, west, north and south parts of a city, may have a dynamically tracked demand curve for certain types of deliverable foods (or goods). That is, demand for pizza, by way of example, may vary by time of day, day of week, and so on, and this demand may change over time, i.e., more pizza may be consumed during weaker economic times, as pizza is an inexpensive food.

As such, a food vendor truck may, for example, use the demand curve hash to place the truck at the optimal microgeography in order to maximize sales. Moreover, this truck position, since the truck is mobile, may be changed throughout a day to stretch daily sales.

Yet further, this information may be used by owners of stationary businesses to optimize staffing, ingredient purchasing, and to avoid spoilage or loss, for example. By way of example, a business in a certain part of a city may know, based on the demand curve hash, that more deliver staff is needed between 11 PM and 1AM than between 9 PM and 11 PM, and may staff accordingly. Further, a business may learn that, in its line of food, demand gradually increases from Thursday late afternoon through late Saturday night, and then gradually decreases to a lower, stable state from Sunday afternoon through Wednesday night. Accordingly, the business may change to receive inventory deliveries on Thursday mornings, to provide the freshest foods and to minimize spoilage.

Further, the aforementioned secure hash may include other information such as may be unique to food order delivery. By way of example, the hash may include delivery-related information. For example, such information may include historic traffic information, such as by geography and/or by time of day. Thereby, the best method of delivery, which may vary, can be assessed. For example, deliveries by car in Manhattan may be difficult between 7 AM and 9 PM daily, and thus, for the most efficient order delivery, scooters or bicycles may be best-used during those times.

Moreover, delivery point information may include those locations with exposed roofs, balconies, and/or those locations that are ADA-compliant. Such information may allow for delivery by drone and/or robotics, by way of example. In short, such deliveries are enabled in that locations with open-roof areas allow for landing of drones thereon, and ADA-compliant locations would negate the need for delivery robot to climb steps. Such information (particularly for ADA compliance) may, of course, be obtained from publicly-open databases online, for example.

Accordingly, the disclosed hash ledger may "consider" various meta data unconsidered in the known art. As used herein, meta data includes a data set or sets that describe another data set. The disclosed metadata may include descriptive metadata, structural metadata, administrative metadata, statistical metadata, and reference metadata, related to the hash generation described herein. These subsets of metadata may be inter-related in the embodiments so as to solve the "traveling salesman" problem apparent to the skilled artisan, i.e., given a list of locations and a demand for each location, what is the most efficient possible route to visit each location once, meet each locations maximum demand, and return to the starting point. This is understood to be one of the most difficult issues to solve in the study of optimization, and it is remedied for food trucks and food truck delivery in the embodiments, using the disclosed hash encompassing the disclosed metadata.

More particularly and by way of example, the embodiments may include accumulated descriptive historical metadata amongst a series of locations within an "operating range" of a food truck related to sales at those locations, and times of day of sales. This descriptive metadata may further include structural metadata regarding the relationships indicated by the descriptive metadata.

The hash described may then analyze this metadata, and my generate metadata from that analysis indicative of where a food truck should be, and when, to make optimal sales; as well as best routes to move between optimal locations at optimal times. This may similarly be done with delivery from the food truck. That is, the disclosed hash algorithm may thus optimize productivity and profitability, while minimizing expenses (including from where, and when, ingredients should be obtained, etc.), of a food truck and/or its deliveries.

The hash-generated metadata may be subjected to administrative metadata. Further, statistical metadata may also be gleaned from the success or veracity of the hash generated metadata. Reference metadata may then stem from an analysis of the veracity of the statistical metadata. Consequently, the embodiments disclose a data accumulation, metadata generation, hash application, and then metadata feedback closed loop system, whereby predictive demand, best routes and locations (i.e., for food truck movement at certain times a day, and/or best delivery routes to meet demand and keep food hot), and for the obtaining of ingredients, etc., are created and updated.

It goes without saying that this overwhelming amount of computation can only be generated by large-scale computational capabilities. Thus, while the disclosed information (i.e., routes, best locations, delivery prioritization, etc.) may be provided locally, such as on an app, the generation of this information may be provided via a "back-end" computing system. In short, the embodiments may thus be provided to users as a thin-client application.

What is claimed is:

1. A method for delivering an item from at least one vendor to at least one requester, the method comprising, with at least one computing device:

creating a plurality of hash ledgers by retrieving, transforming and indexing data, wherein the data is transformed using a hash function, wherein the hash function converts an input value into a compressed numerical value;

continuously building and updating the plurality of hash ledgers;

accessing, by the at least one vendor, from the plurality of hash ledgers, data comprising one or more sales locations within an operating range of the at least one vendor, wherein the one or more sales locations are calculated from metadata comprising historic sales data from the one or more sales locations;

positioning the at least one vendor at a location selected from the one or more sales locations based on data from the plurality of hash ledgers;

accessing, by the at least one vendor, from the plurality of hash ledgers, data comprising: (i) at least one demand, and (ii) at least one location from the at least one requestor;

changing an inventory of the at least one vendor based on the data from the plurality of hash ledgers, wherein the inventory comprises one or more items sold by the at least one vendor;

accessing, by the at least one requestor, from the plurality of hash ledgers, data comprising: (i) a list of the at least one vendor, (ii) the location for the at least one vendor, and (iii) a list of the one or more items sold by the at least one vendor, wherein at least one of the plurality of hash ledgers is a public ledger;

sending a request to the at least one vendor from the at least one requester for one or more items selected from the list of the one or more items;

fulfilling the request by the at least one vendor by delivering the one or more items to the at least one requester;

accessing, by the at least one vendor, from the plurality of hash ledgers, data comprising a list of one or more delivery methods; and generating a metadata feedback loop, wherein the plurality of hash ledgers may be subsequently modified according to the generated metadata feedback loop.

2. The method of claim 1, wherein the at least one vendor is a food truck.

3. The method of claim 1, wherein the plurality of hash ledgers further comprises one or more types of item for the one or more items.

4. The method of claim 1, further comprising:

tracking a geographical location of the at least one vendor in the plurality of hash ledgers.

5. The method of claim 1, wherein the request includes at least one food order to be placed with the at least one vendor.

6. The method of claim 5, wherein the plurality of hash ledgers further includes payment information for the request.

7. The method of claim 5, wherein the plurality of hash ledgers further includes location information of the at least one requester.

8. The method of claim 1, wherein the hash function converts the input value into the compressed numerical value thereby eliminating plain text of the data and producing a unique hash message digest which cannot be discerned unless given information on where to find the message digest, cannot be spoofed or copied and simplifies searches.

9. The method of claim 1, wherein the one or more delivery methods are assessed based on the at least one location of the at least one requestor, the location of the at least one vendor, the time of day, and historic traffic data.

10. The method of claim 1, wherein the metadata feedback loop regards statistical metadata on outcomes of the request fulfillment.

* * * * *